United States Patent Office 3,509,497
Patented Apr. 28, 1970

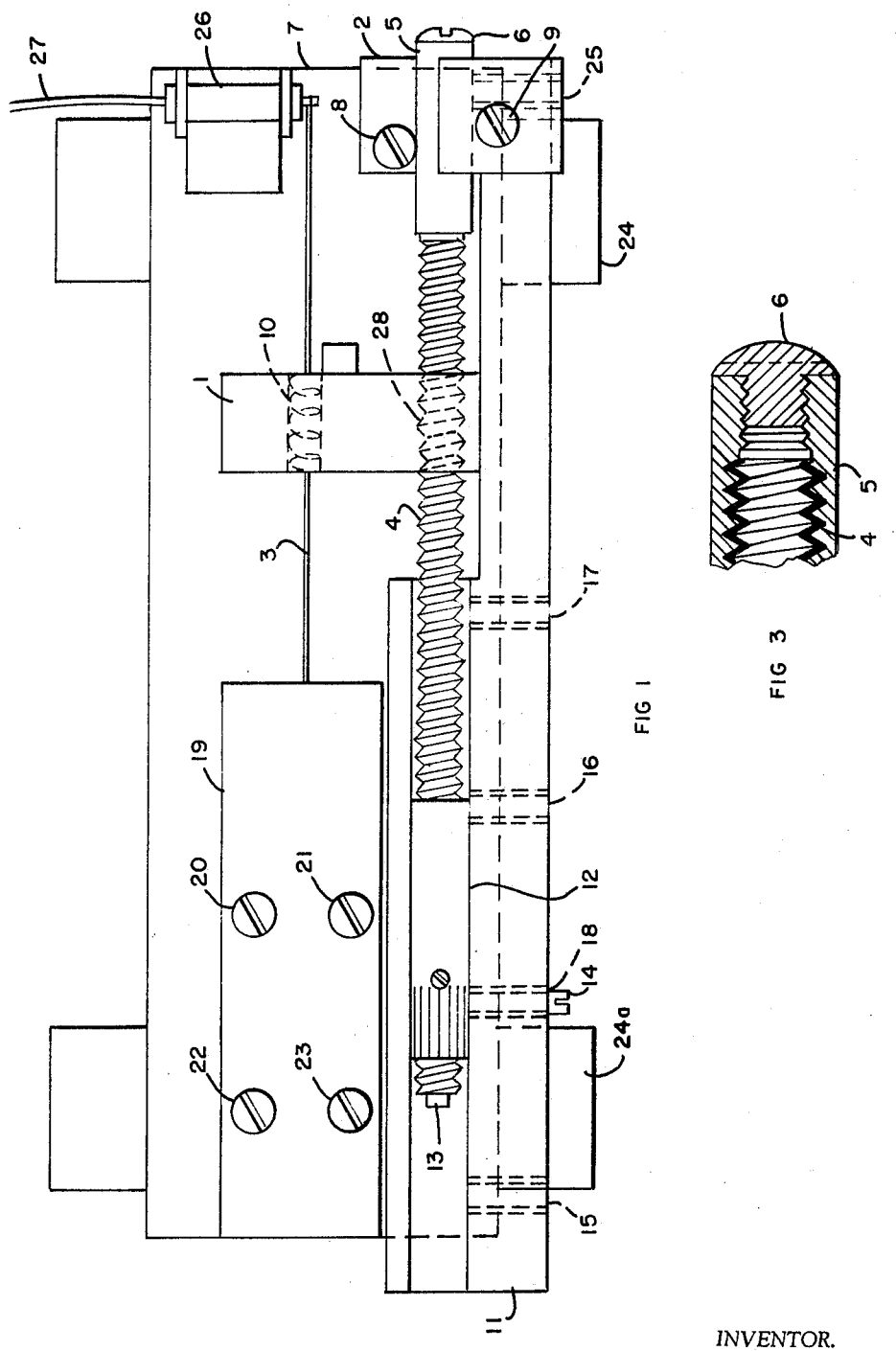

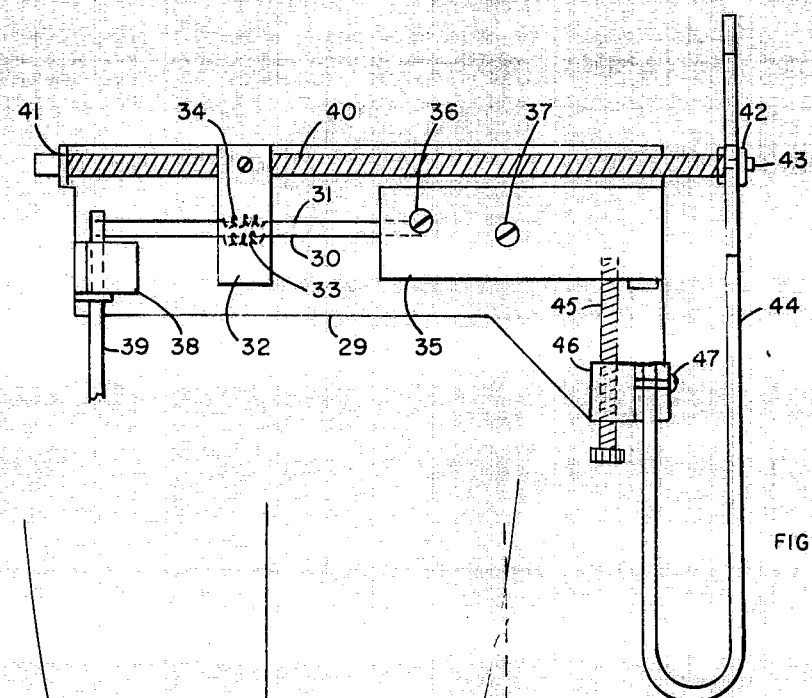
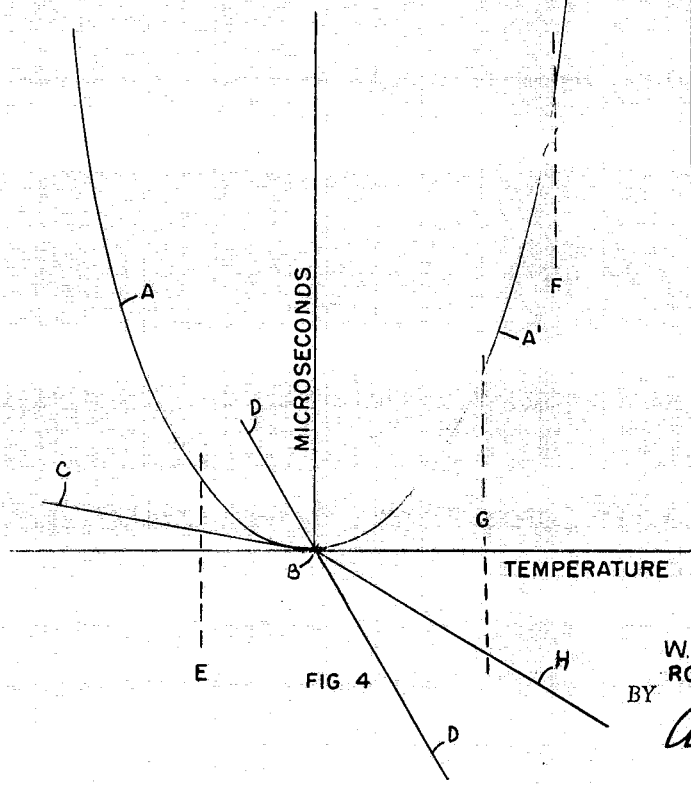

3,509,497
TEMPERATURE COMPENSATION METHOD AND MEANS FOR ACOUSTICAL DELAY LINES
W. John Harwood, Huntington, and Robert E. Lindemann, Farmingdale, N.Y., assignors to Digital Devices, Inc., Syosset, N.Y., a corporation of New York
Filed Apr. 21, 1967, Ser. No. 632,586
Int. Cl. H03h 7/36
U.S. Cl. 333—30         10 Claims

ABSTRACT OF THE DISCLOSURE

An acoustic delay line is one which uses magnetostrictive excitation to provide longitudinal or torsional acoustic waves in a wire line. Such lines are useful in handling digital information in the computer field. Input transducers at one end of the line apply the input waves and output transducers at the remote end of the line or at an intermediate point receive the delayed waves or signals. The delay time between input and output is a function of the material of which the line is composed and the length of the line between the input and output transducers.

---

In many applications it is necessary that the delay time be accurately known and constant. It has been found that the delay time in such a line changes somewhat with temperature. The temperature effect may be a complex function and has been found, in some cases, to be of a parabolic form with the apex of the parabola in the vicinity of room temperature (20–25 degrees C.). It has been found possible to compensate the temperature effect over a range both above and below room temperature in accordance with the present invention.

A preferred form of the present invention employs a bellows drawn in the form of a helix. The transducer or transducers at one end of the delay line are mounted on this helix so that the position of the transducer may be changed along the delay line by rotating the helix. The helix is filled with a fluid having a predetermined temperature coefficient of expansion. The helix will then elongate in accordance with the temperature coefficient of this fluid at temperatures above the filling temperature and will contract at a different rate at temperaures below the filling temperature. This inflection approximates a portion of a parabola for compensating the temperature characteristics of the delay line.

The helix may be clamped at either end providing either positive or negative correction to the delay time. The helix may be rotated to vary the length of helix between the transducer and the clamped end to vary the total temperature connection i.e. the slope of the incremental delay vs. temperature.

BACKGROUND OF THE INVENTION

Field of the invention

The present invention relates to wave transmission lines and networks (333) and sub-class (30) electromechanical transducer types.

Description of the prior art

Previous devices for compensating temperature effects in acoustical delay line have been relatively crude and non-adjustable.

SUMMARY

The present invention comprises, in its preferred form, the use of a bellows in the form of a helix and filled with a temperature expansible fluid to provide a wide range of temperature compensation in connection with an acoustic delay line. In addition the invention comprises temperature compensating means for an acoustic delay line exhibiting a complex and readily tailored temperature coefficient of expansion and contraction in order to match a parabolic or other non-linear acoustic delay line temperature characteristic.

One object of the present invention is to provide a method of and means for compensating the temperature dependent delay characteristics of an acoustic delay line.

Another object is to provide temperature compensating means for an acoustic delay line or the like which has a characteristic substantially matching a portion of a parabola.

Still another object is to provide acoustic delay line temperature characteristic compensating means capable of assuming a wide range of linear, non-linear or complex characteristics.

A further object is to provide acoustic delay line temperature compensating means which is readily adjusted to varying requirements.

A still further object is to provide acoustic delay line temperature compensating means which can be adjusted to provide either a positive or a negative slope and to provide slope control.

BRIEF DESCRIPTION OF THE DRAWINGS

FIGURE 1 is a plan view of the preferred form of the present invention.

FIGURE 2 is a plan view of another form of the present invention.

FIGURE 3 is a cross-section of a portion of the invention as shown in FIGURE 1.

FIGURE 4 is a set of curves of use in explaining the operation of the invention.

DESCRIPTION OF THE PREFERRED EMBODIMENTS

FIGURE 1 shows the preferred form of the present invention wherein a base plate 7 serves as a support means for the various other components. Base plate 7 is provided with feet 24 and 25 for convenience in mounting the device. The acoustic delay line 27 projects through holder 26 to permit attachment of the torsional driver ribbons 3 which in turn terminate in block 19 secured to base plate 7 by means of screws 20, 21, 22 and 23. The torsional driver ribbons are excited by means of electrical currents passed through transducer coils 10 carried by holder 1. Holder 1 is coupled to screw 4 by means of internal threads 28. The timing of pulses applied to the delay line 27 is controlled by the position of block 1 along ribbons 3 as will be described in detail below.

The position of block 1 can be changed by rotating screw 4. The construction of screw 4 is such that it is useful not only to set the delay time accurately but also to provide temperature compensation for the delay line.

It has been found that if screw 4 is constructed of a hollow bellows having a helical outer rib form, that this bellows can be filled with a fluid having a temperature coefficient of expansion so that it will expand, and therefore elongate with increasing temperature. The bellows 4 carries a fitting 12 at one end and another fitting 5 at the other end. Fitting 12 may be clamped in a fixed position in block 11 by screw 14 placed in any one of tapped holes 15, 16, 17 or 18. Block 11 is fastened in a fixed position to base 7 by suitable means not shown. Alternately fitting 5 may be clamped in block 2 by a screw, not shown, in tapped hole 25. Block 2 is fixed on base 7 by screws 8 and 9. When the bellows is filled with fluid, its ends are sealed as by plug 13 and cap screw 6. It will be seen that if fitting 12 is fixed in position, expansion of bellows 4 will move transducer 10 in a direction to effectively shorten the length of the acoustic delay line and therefore will shorten the delay time. Conversely, if fitting 5 is clamped, expansion of bellows 4 will increase the delay line.

Disregarding the temperature effects of the fluid and the bellows, the delay time of the line may be precisely set by rotating bellows 4 carrying transducers 10 to an appropriate point along ribbons 3 or this adjustment may also be made merely by moving bellows 4 one way or the other without either end being clamped.

The temperature compensation which may be accomplished with the device as shown is very flexible. One adjustment is the free length of bellows between holder 1 and, the end clamps 12 or 5. As stated above either a positive correction or a negative correction may be provided depending on whether fitting 12 or fitting 5 is clamped. Another factor is the temperature coefficient of expansion of the fluid with which the bellows is filled. Still another factor is the temperature at which the bellows is filled since for temperatures above the filling temperature the fluid expansion is controlling while below the filling temperature the expansion coefficient and stiffness of the bellows is controlling. Other factors include the compressibility of the filling fluid with pressure, the restraining force of the bellows, and the change in vapor pressure (boiling and freezing points of the fluid) due to changes in pressure resulting from expansion or contraction of the bellows. More will be said about these various factors in connection with FIGURE 4 described in detail below.

FIGURE 3 is a cross-sectional view through fitting 5 showing one method how bellows 4 is screwed into fitting 5 to seal it and in turn how cap 6 screws into fitting 5 to complete the seal. Filling of the bellows with fluid may be accomplished by removing cap 6.

FIGURE 4 illustrates only a few of the compensating characteristics which may be provided by the device of the present invention as described above. It has been found that the temperature coefficient of expansion of a typical acoustic delay line may have a generally parabolic form as shown by curve A. The curves are plotted in terms of microseconds delay of the delay line against temperature. The origin or apex of the parabola will generally be in the vicinity of the origin of such a plot i.e. at or near point B. In order to compensate for such a characteristic it is necessary to provide means which changes its coefficient or slope at or near the origin (point B). In accordance with the present invention if the filling temperature of the bellows is this temperature at B such a change in slope will be provided. The line D may represent the slope of the compensation at temperatures above the filling temperature while C represents the slope below the filling temperature. It will be seen that these compensation curves D and C approximate the parabolic curve representing the delay line to within a predetermined error from say E to F. A closer match over a smaller range can be provided with a lower positive coefficient (by making the effective length of the bellows smaller from block 1 to clamped fitting 12) as represented by line H. In this way composite curve C and H match to a higher degree from E to G.

FIGURE 2 illustrates a modified form of the present invention in which the temperature compensating of the delay is provided by means of a bi-metallic device. The torsionally excited acoustic delay line 39 passes through an end support 38 carried on a base member 29. The line is driven by two magneto-strictive ribbons 30 and 31 passing through transducer coils 33 and 34 carried by block support 32. The ends of ribbons 30 and 31 are held in block 35 secured to base 29 by screws 36 and 37. The position of the transducers and therefore the time delay of the line may be adjusted by means of screw 40 threaded through the end of block 32. Screw 40 is held in position laterally but with freedom to rotate and to move longitudinally by end support 41. The other end of screw 40 is held in longitudinal position by collar 42 whereby screw 40 is moved longitudinally by one end of bi-metallic U-shaped temperature compensator 44. Screw 40 may be rotated by a screw driver in slot 43. The other end of bi-metallic compensator 44 is fastened securely to block 46 by screw 47. It will be seen that screw 40 may be turned to position transducer coils 33 and 34 with respect to ribbons 30 and 31 in order to adjust the delay time of the delay line. When the temperature changes, bi-metallic compensator 44 changes its angle of bend moving screw 40 longitudinally and thereby changing the position of transducers 33 and 34 to compensate the change of delay time in the delay line with temperature. The position of block 46 and hence one end of bi-metallic compensator 44 is adjustable by means of screw 45 bearing in block 35. This movement of compensator 44 effectively changes the length of the arm moving screw 40 and hence provides means for adjusting the temperature compensation of the line.

While only two forms of the present invention have been shown and described, many modifications will be apparent to those skilled in the art and within the spirit and scope of the invention as set forth, in particular, in the appended claims.

We claim:
1. Acoustic delay line apparatus including in combination:
   an acoustic delay line;
   transducer means coupled to said delay line for applying signals to be delayed to said line; and
   adjustable means including a screw member on which said transducer means is mounted for moving said transducer means with respect to said line for adjusting the delay time of said line, said adjustable means including materials having two different temperature coefficients of expansion arranged to produce axial movement of at least a portion of said screw member according to changes in ambient temperature whereby to temperature compensate the delay of signals traversing said line.
2. Acoustic delay line apparatus according to claim 1 wherein at least a portion of said screw member is a hollow bellows.
3. Acoustic delay line apparatus according to claim 2 wherein said hollow bellows is filled with a temperature expansible fluid.
4. Acoustic delay line apparatus according to claim 2 wherein said hollow bellows is filled with a fluid having a predetermined temperature coefficient of expansion.
5. Acoustic delay line apparatus according to claim 2 including means for clamping one end of said bellows.
6. Acoustic delay line apparatus according to claim 1 wherein one of said materials is a fluid.
7. Acoustic delay line apparatus according to claim 1 wherein said materials are bimetallic.
8. Acoustic delay line apparatus according to claim 1 wherein said adjustable means includes a resilient member formed of said materials, means anchoring one end of said resilient member, and means connecting said screw member to said resilient member so that said screw member will move axially when said resilient member undergoes contraction or expansion in response to a change in temperature.

9. Acoustic delay line apparatus according to claim 8 wherein said screw member is rotatable on its axis relative to said resilient member.

10. Acoustic delay line apparatus according to claim 8 wherein said resilient member is bimetallic.

References Cited

UNITED STATES PATENTS

| | | | |
|---|---|---|---|
| 2,760,165 | 8/1956 | Sullivan. | |
| 3,098,985 | 7/1963 | Rhodes | 333—30 |
| 3,241,090 | 3/1966 | Bastian | 333—30 |
| 3,395,369 | 7/1968 | King | 330—30 |

HERMAN K. SAALBACH, Primary Examiner

T. VEZEAU, Assistant Examiner